United States Patent Office 3,518,301
Patented June 30, 1970

3,518,301
ALKYL AROMATIC OXIDATION PROCESS
Charles L. Thomas, Swarthmore, Pa., assignor to Sun Oil Company, Philadelphia, Pa., a corporation of New Jersey
No Drawing. Filed Oct. 6, 1966, Ser. No. 584,663
Int. Cl. C07c 63/02
U.S. Cl. 260—524          8 Claims

ABSTRACT OF THE DISCLOSURE

This invention relates to the oxidation of alkyl aromatic compounds to aromatic carboxylic acids and polycarboxylic acids. In more particular, it relates to a catalytic method of oxidizing alkyl aromatic hydrocarbons to aromatic carboxylic acids wherein a copper chromite is employed with one or more known oxidizing gases.

BACKGROUND OF THE INVENTION

Various prior art processes have been proposed for the oxidation of aromatic compounds to aromatic acids, and although some have met with considerable success in some respects, they have generally, in final analysis, met with such limited success that there is much room for improvement. Examples of the problems encountered wherein improvement is highly desirous are:

(1) Where the employment of toxic and/or hazardous materials, such as selenium dioxide, as an oxidation catalyst or at least an oxidation promoter are employed;

(2) Where the catalyst materials are exotic or complex in nature require difficulty and expense to obtain and maintain in a state of good activity;

(3) Where rare materials are involved and are thus available only in limited quantities and/or at great expense and with considerable difficulty;

(4) Where the processes do not use special materials, but produce troublesome separation problems because the catalyst itself must be in a form which requires expensive and complex equipment and techniques to be recovered or even to be used in the first instance; and (5) Where the process must be carried out in a batch operation or otherwise interrupted procedure.

It can be seen that an oxidation catalyst overcoming the foregoing difficulties is to be highly commended and making certain oxidation processes commercially practicable that have not been heretofore.

DESCRIPTION OF THE INVENTION

It is the objects of the present invention to obviate, or at least substantially ameliorate, the foregoing problems so as to provide an improved process of oxidizing alkyl aromatic compounds to aromatic carboxylic acids. Another important object is to provide a novel oxidation catalyst for the oxidation of alkyl aromatic hydrocarbons to aromatic carboxylic acid which will function in such an oxidation process so as to obviate or substantially ameliorate the foregoing problems experienced with prior art oxidation catalysts of any note.

It is an important object to provide a continuous process improved in many manner of ways. Other related specific objects, however, will become apparent from a reading of this disclosure in entirety.

To the accomplishment of the foregoing and related objects, an alkyl aromatic compound is contacted in the liquid phase in the presence of a copper chromite catalyst at a temperature in the range of about 150° to 230° C. with an oxidizing agent selected from the group consisting of oxygen, nitrogen oxide, nitrous fumes and mixtures of the foregoing.

The aromatics which may be oxidized by this invention are generally speaking those same ones oxidized by the prior art process, for example, toluene; xylenes (especially the 1,4 isomer); ethylbenzene; 1,2,4,5- and the other tetramethylbenzenes; octylbenzene; eicosylbenzene; diethylbenzene; methyl propylbenzene; ethyl hexylbenzene; dihexylbenzene; butyl dodecylbenzene; methyl tetradecylbenzene; didodecylbenzene; ether eicosylbenzene; and dieicosylbenzene. The important 1,4- disubstituted compounds of the foregoing are definitely suitable. Other examples are methylnaphthalenes; ethylnaphthalenes; eicosylnaphthalenes; dimethylnaphthalenes, such as 1,4-dimethylnaphthalene,
1-methyl-6-ethylnaphthalene,
2,6-dimethylnaphthalene,
1-methyl-5-hexylnaphthalene,
1-propyl-8-pentylnaphthalene,
2-ethyl-7-nonylnaphthalene,
2-butyl-6-decylnaphthalene,
2,6-dibutylnaphthalene,
2,7-dihexylnaphthalene,
2-pentyl-6-dodecylnaphthalene,
2,6-didodecylnaphthalene,
2-methyl-6-octadecylnaphthalene,
2,6-dieicosylnaphthalene and the like, and mixtures of the foregoing.

The oxidizing agent can be an elemental oxygen containing gas, nitrogen dioxide, nitrous fumes (i.e., a mixture of nitric oxide and nitrogen dioxide), or mixtures of same. Preferably, the oxidizing agent comprises nitrogen dioxide in part at least. The oxidizing gas may be fed in co-currently with the alkyl aromatic feed, or it may be fed in counter-currently in the case of a packed bed of the catalyst material. Where a suspension or dispersion form of the catalyst is desired for some reason, the oxidizing agent can be advantageously charged below the liquid level to achieve advantages of catalyst agitation and thorough contact. In the case of a packed bed, a counter-current flow of oxidizing agent provides for more thorough mixing and contact in that type of operation. In any event, the preferred oxidizing agent is nitrogen dioxide which may be formed in situ if desired by charging nitric oxide and oxygen to the reaction zone.

The catalyst itself is a promoted or unpromoted copper chromite. If promoted, it is generally with a metal compound selected from the group consisting of barium, zinc, magnesium, calcium, vanadium and cobalt. Such catalysts are conveniently prepared by adding ammonium chromate to a solution of barium and copper nitrates to prepare an amonium barium copper chromate. The precipitation is dried and then "glowed" by heating to a temperature not exceeding about 350° C. whereby the chromate precipitate is transformed to a fine powder of barium copper chromite. Generally, the amount of promoter in the catalyst does not exceed about 15% by weight (calculated as the oxide) based on the total weight of the barium copper chromite. Such catalysts and their preparation are described in U.S. Pat. No. 1,902,160; U.S. Pat. No. 2,092,059; Canadian Pat. No. 368,866 and page 13 of Adkins "Reactions of Hydrogen," University of Wisconsin Press, 1937.

Once prepared, the catalyst can be employed in any one of various possible forms, that is, in granules or pellets of the size conventionally employed in packed bed liquid flow processes. On the other hand, the catalyst may be employed in the fine powder form as produced directly within the "glowing" operation and dispersed in the liquid reaction medium or granular form kept dispersed through the liquid reaction medium by very vigorous agitation. While the procedure involving granules dispersed by means of vigorous agitation has some disadvantages associated therewith, there are also certain clear advantages over the use of fine particles in that subsequent separation of the catalyst from the reactor fluids is greatly facilitated. In some cases involving dispersions about 1 to 10% by weight of the catalyst, based on the total mass in the reactor, will be found quite suitable. Preferably, about 2 to 5% of catalyst on the same basis is employed.

In the preferred form of the invention wherein a packed catalyst bed is employed, it suffices to say that a space velocity (volumes of liquid per volume of catalyst per hour) on the order of about 0.5 to 10 in the presence of the ozidizing agent will be found suitable. However, on occasion a residence time outside those limits may be found desirable. The preferred time can be readily determined by those skilled in the art by routine experimentation based on considerations important in the particular case, now that I have disclosed this inventive technique and important relationships thereof.

The temperature normally will be in the range of about 150° to 230° C. The most preferred temperature will, of course, vary depending on the particular reactants (as does space velocity, of course) and in some cases on the by-products produced, since one or more of them may be desired by the particular operator of the process based on considerations peculiar to him. The reaction is highly exothermic, and for that reason, cooling of the reaction zone will normally be required to maintain the foregoing temperatures, but this can be done without difficulty. Inert diluents may be employed as another means of regulating this feature and certain others readily apparent, but the manner of cooling is optional.

The preferred pressure is about atmospheric, although superatmospheric and subatmospheric can be employed and in certain instances may be desired.

Because some of the reactants, and more particularly many of the products, are solids at the operating temperatures contemplated and set forth, a substantially inert solvent will be found essential for all practical purposes. These solvents, known in the art for similar oxidation reactions, can be advantageously employed. Illustrative, but non-limiting, examples are chlorinated aromatics, such as trichlorobenzene, tetrachlorobenzene, chlorinated biphenyls, nitrobenzene, alkanoic acids of about 2 to 8 carbon atoms or any excess of the alkyl aromatic hydrocarbon being oxidized can be used as a solvent.

In most cases the conversion is intentionally limited to less than 50% before the product is separated and unconverted material recycled. Conversions in the range of 20 to 40% are preferred. Undesired by-products are produced and yields reduced if higher conversions obtain.

Having now discussed the invention in broad and general terms and certain features with varying degrees of particularity, it is believed that any further discussion of the invention will be more beneficial in conjunction with detailed working examples. It is to be understood that the examples found hereinbelow are merely illustrative and are not limiting, the same being offered merely to facilitate the understanding of the present invention. It is to be further understood, of course, that all the reaction variables are more or less interdependent and, accordingly, when one variable is arbitrarily fixed, the limits within which others may be varied are somewhat restricted. The more desirable ranges for ordinary applications of my invention are indicated herein, and these can also be ascertained from the specific illustrative examples presented herein. However, for any particular application of my invention, the most desirable conditions can be readily determined by routine trial by one skilled in the art, such a determination being facilitated by the discussion of the relationship and trends of the variables presented herein and in the example.

EXAMPLE

About 100 gms. of 2,6-dimethylnaphthalene and about 500 mls. of trichlorobenzene solvent are charged to a two-necked 2 l. flask equipped with a reflux condenser, a mechanical stirrer and a tube extending below the surface of the liquid. About 5% by weight based on the foregoing liquid of barium-promoted copper chromite prepared according to the procedure in Adkins "Reactions of Hydrogen" discussed above, in finely divided particles as directly obtained from "glowing" operation is charged to the flask. The reaction mixture is heated to the boiling point of trichlorobenzene (about 210° C.) and nitrogen dioxide gas is charged from a cylinder as fast as it is absorbed. As the reaction proceeds, the rate of absorption decreases, so the feed rate is reduced accordingly. The 2,6-naphthalene dicarboxylic acid separates as a crystalline solid on cooling and the remaining 2,6-dimethylnaphthalene plus monocarboxylic acid is recharged and reacted again so as to amount to recycle of same and increase the ultimate conversion and yield.

When the process is carried out as above, except that a mixture of nitrous fumes and oxygen are charged for nitrogen dioxide and an excess of molten, 2,6-dimethylnaphthalene is used as solvent, essentially no difference in results is obtained.

Having now described the invention, many ramifications and modified embodiments will readily occur to those skilled in the art. Insofar as such variations do not depart from the spirit and scope of the invention described in this application, they are intended to be embraced by the appended claims in their broadest construction.

I claim:

1. A process of oxidizing alkyl aromatics to aromatic carboxylic acids comprising contacting an alkyl aromatic compound in the liquid phase with nitrogen dioxide as an oxidizing agent in the presence of a copper chromite catalyst at a temperature in the range of about 150° to 230° C.

2. A process according to claim 1 wherein the catalyst is promoted with a metal compound selected from the group consisting of barium, zinc, magnesium, calcium, vanadium and cobalt.

3. A process according to claim 1 wherein a solvent is employed.

4. A process according to claim 3 wherein the solvent is excess alkyl aromatic hydrocarbon.

5. A process according to claim 3 wherein the alkyl aromatic is 1,4-dimethylbenzene.

6. A process according to claim 1 wherein the alkyl aromatic is 2,6-dimethylnaphthalene.

7. A process according to claim 1 wherein the catalyst is promoted with a metal compound selected from the group consisting of barium, zinc, magnesium, calcium, vanadium and cobalt, wherein a chlorinated aromatic solvent is employed and wherein the alkyl aromatic is 1,4-dimethylbenzene.

8. A process according to claim 1 wherein the catalyst is promoted with a metal compound selected from the group consisting of barium, zinc, magnesium, calcium, vanadium and cobalt, wherein a chlorinated aromatic solvent is employed and wherein the alkyl aromatic is 2,6-dimethylnaphthalene.

References Cited

UNITED STATES PATENTS

| | | | |
|---|---|---|---|
| 1,902,550 | 3/1933 | Forrest et al. | 260—524 |
| 2,245,528 | 6/1941 | Loder | 260—524 |
| 2,552,267 | 5/1951 | Emerson et al. | 260—524 |
| 2,839,575 | 6/1958 | Fetterly. | |

LORRAINE A. WEINBERGER, Primary Examiner

R. WEISSBERG, Assistant Examiner